July 23, 1957  J. G. DRENNAN  2,800,226
ARTICLE SORTING APPARATUS
Filed Feb. 1, 1955  2 Sheets-Sheet 1
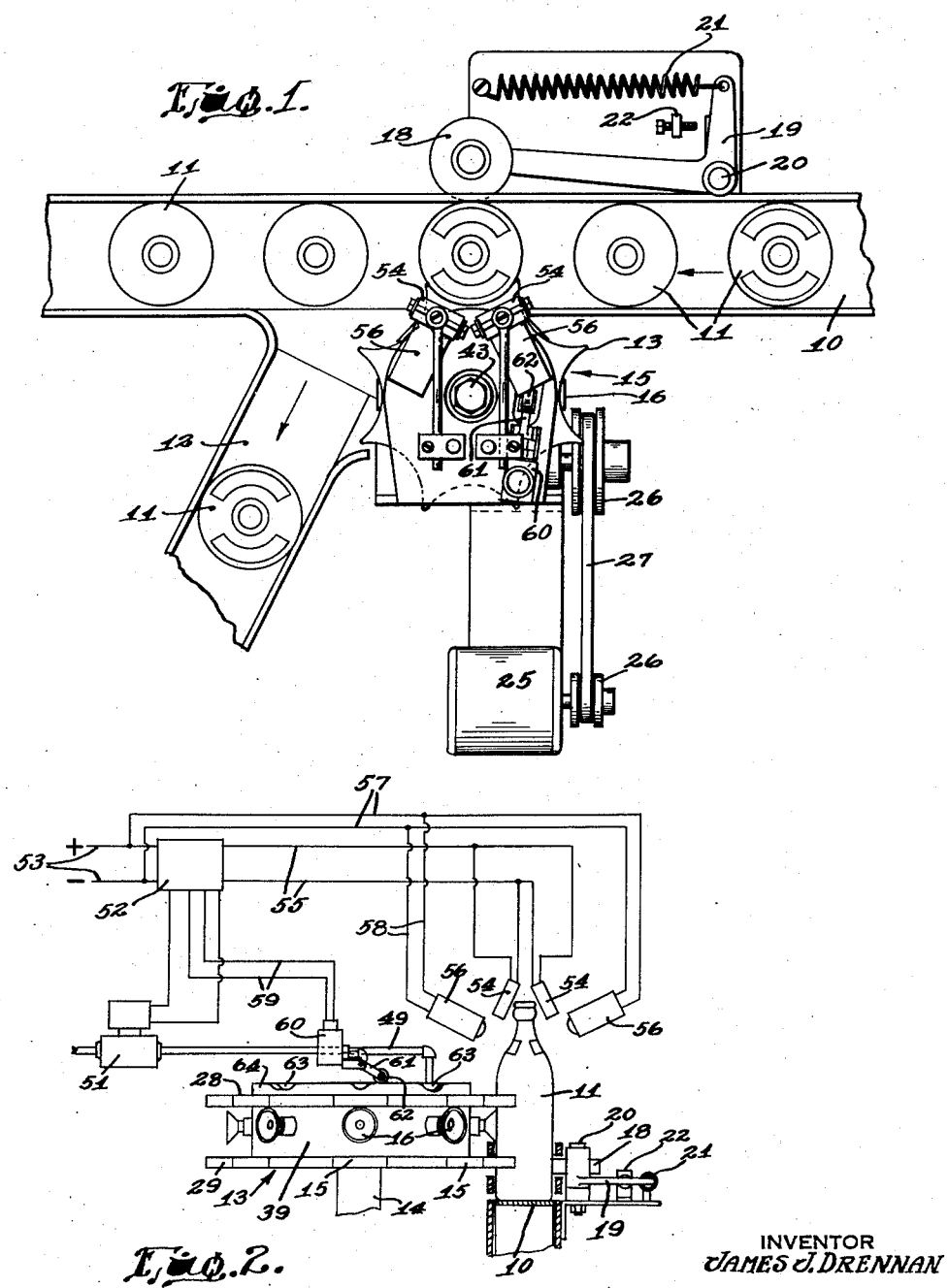
INVENTOR
JAMES J. DRENNAN
BY
Rule & Hoge
ATTORNEYS July 23, 1957  J. G. DRENNAN  2,800,226
ARTICLE SORTING APPARATUS
Filed Feb. 1, 1955  2 Sheets-Sheet 2

INVENTOR
JAMES J. DRENNAN
BY
Rule & Hoge
ATTORNEYS

United States Patent Office 2,800,226
Patented July 23, 1957

2,800,226
ARTICLE SORTING APPARATUS

James G. Drennan, San Mateo, Calif., assignor to Owens-Illinois Glass Company, a corporation of Ohio Application February 1, 1955, Serial No. 485,466

12 Claims. (Cl. 209—111)

The present invention is an article sorting apparatus and has for an object the provision of a completely automatic high-speed device which is capable of selecting and removing from a conveyor line, continuously moving articles, such for example as bottles, having predetermined distinctive surface characteristics, such as applied exterior surface decorations, lettering, or the like.

Another object of my invention is the provision of novel apparatus for removing labeled bottles, or like articles from a continuously moving line of articles, some of which are labeled while others are unlabeled, so that only those articles requiring new labels will remain in line and be carried to the labeler.

It is also an object of my invention to provide novel, positive and reliable means for dividing a single continuously moving line of bottles, or other articles, into two or more lines as determined by distinctive characteristics of their exterior surfaces, or perhaps irrespective of any differences in the articles and merely to facilitate handling at a given point in the conveying system.

Other objects will be in part apparent and in part pointed out hereinafter.

In the drawings:

Fig. 1 is a plan view illustrating the invention mounted at the juncture of two horizontal conveyors;

Fig. 2 is a sectional elevational view in which the electrical system is diagrammatically illustrated;

Figure 3:
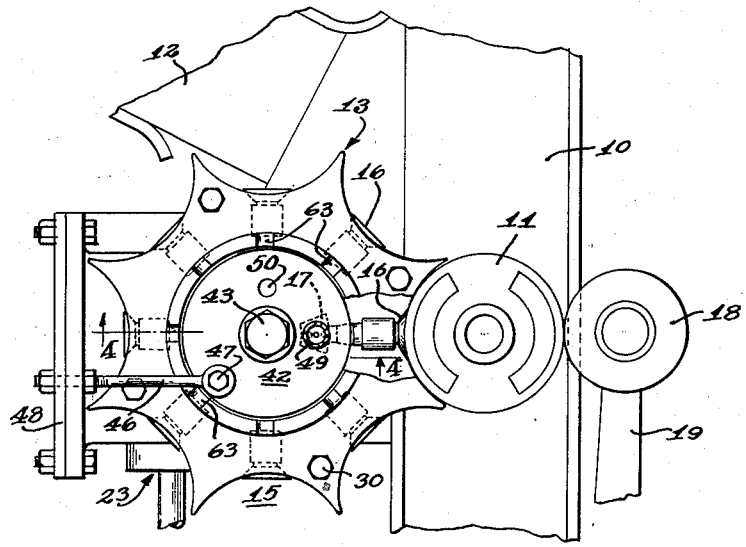
Fig. 3 is a fragmentary detail plan view of the transfer wheel.

In the illustrated embodiment of my invention it is shown positioned at the juncture of a horizontal conveyor 10 upon which both labeled and unlabeled bottles 11, or like articles, are arranged in upright position for transfer from a bottle filling machine (not shown) to a packing station (not shown) or a labeling machine (not shown). At a predetermined point along the conveyor 10, bottles already suitably labeled are removed from the main line conveyor 10 and transferred to a by-pass conveyor 12 which carries the labeled bottles around the labeler and on to the packing station. The remaining bottles on the conveyor 10 are carried thereby to the labeler and from the labeler the bottles are transferred to the packing station where they are placed in cartons, crates, or like receptacles.

At the juncture of the conveyors 10 and 12 my article sorting or selecting apparatus is positioned so that it functions automatically to positively transfer already labeled bottles or such articles to the by-pass conveyor 12 which, as stated previously, carries the articles to the packing station.

The transfer mechanism comprises a transfer wheel 13 which is suitably mounted at the juncture of the two conveyors with its axis of rotation 14 extending vertically. This transfer wheel is provided with an annular series of recesses or pockets 15 and in each pocket is a suction cup 16, the latter being brought into communication with a vacuum chamber 17 during a portion of each complete revolution of a cup about the axis 14, so that if circumstances are such that the bottle or similar article should be removed from the conveyor 10, it will become attached to the suction cup by reason of removal of air from the latter and thereupon travel with the cup until it is in position to be taken away by the by-pass conveyor 12. At this point, means to be described hereinafter, effects breaking of the vacuum and results in the bottle, or such article, being removed from the recess by reason of operation of the by-pass conveyor 12. A yieldingly mounted roller 18 (Figs. 1 and 3) is disposed opposite the transfer wheel 13 for the purpose of firmly pressing the successive bottles or jars against the suction cups and properly positioning such articles in the recesses 15. This roller 18 is carried by a bell-crank lever 19 which is pivoted to a vertical pin 20 and yieldingly held in its innermost position by means of a coil spring 21. An adjustable stop 22 provides means for regulably controlling or determining the innermost position of the roller 18.

Briefly, it may be explained that the presence of a label or some distinctive marking or other characteristic, on a preselected area or zone of the bottle or jar, is the sole element which determines whether the transfer wheel will or will not transfer an article to the by-pass conveyor 12. In the event the bottle, for example, has already been labeled, and properly so, light directed against the label will be reflected in such fashion as to actuate a phototube or phototubes, which in turn operate electrical mechanism designed to open a vacuum control valve so that air may be exhausted from any given suction cup 16. In consequence of this operation the labeled article will be firmly attached to this suction cup and transferred to the by-pass conveyor 12 in the fashion suggested above. Incident to arrival at the point of transfer to the conveyor 12, air is admitted to the suction cup so that the latter releases the article. Periodically the electrical circuit is broken so as to reset certain switches and open the solenoid controlled vacuum valve, as will be apparent hereinafter.

Figure 5:
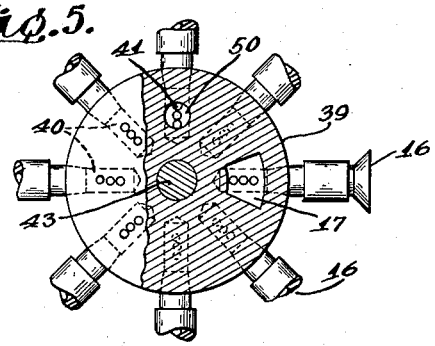
Fig. 5 is a sectional view taken substantially along the line 5—5 of Fig. 4.
Figure 4:
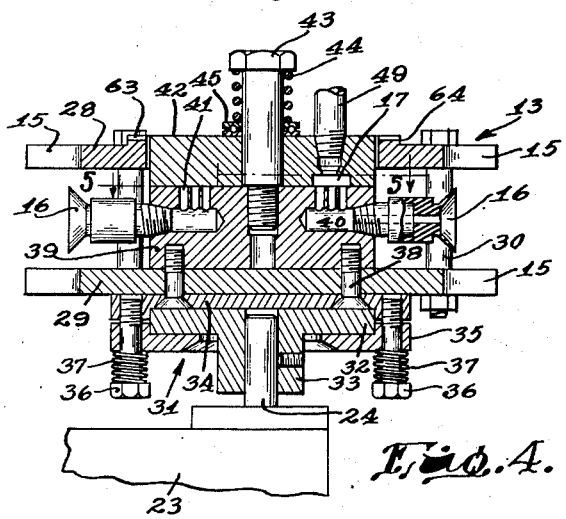
Fig. 4 is a vertical sectional view taken substantially along the line 4—4 of Fig. 3.

Specifically the transfer wheel which may be used to separate labeled from unlabeled bottles, or if preferred, merely to divide a single line of continuously moving articles into two separate lines, may well be constructed as specifically shown in Figs. 3, 4, and 5. The wheel is mounted upon a gear housing 23, the latter carrying an upstanding stub-shaft 24 intended to be driven by a motor 25 (Fig. 1) operating through pulleys 26 and a driving belt 27 which is trained over said pulleys. The wheel is composed of upper and lower starwheels 28 and 29 respectively which are held apart in fixed spaced relationship by spacer bolts 30. In the periphery of each of these starwheels the aforementioned recesses or pockets 15 are formed as indicated in Fig. 4. Rotation of the transfer wheel is obtained through a friction clutch 31 which comprises a driving disk 32, the hub 33 of which is secured to the aforementioned stub-shaft 24. This driving disk 32 is yieldingly held against a face plate 34 on the lower star-wheel 29, by means of a collar 35, the latter being carried by a multiplicity of connecting screws 36 and coil springs 37 which are mounted upon these screws between the head portions and said collar. The collar 35 is free to move vertically on these screws and the springs function to hold the several elements in effective driving relationship, while permitting some degree of slippage in the event such is necessary. The face plate 34 is secured to the lower starwheel 29 by means of attaching screws 38, the latter also serving to secure to the lower starwheel 29, a rotary hub 39 which forms a part of the vacuum supply and exhaust system and additionally supports the aforementioned suction cups 16.

As stated heretofore, it is intended that the air be exhausted from any given suction cup only when that cup is intended to transfer an article from the main conveyor 10 to the by-pass conveyor 12; such being determined solely by the conditions prevailing in a preselected zone or area of the exterior surface of the bottle or other article as explained previously. As best shown in Figs. 4 and 5, the hub 39 which rotates with the transfer wheel is provided with an annular series of radial bores 40 which open through the periphery of said hub and have mounted therein the aforementioned suction cups 16. These suction cups are threaded into the outer end of the bores 40 and project into the recesses 15 a sufficient distance to permit firm engagement between the cups and articles which register with them on the conveyor 10 and which are mover laterally of the conveyor by the yieldingly mounted roller 18. Each of these bores 40 is formed with exhaust ports 41 which open through the upper surface of the hub and normally are sealed by means of a stationary cover plate 42, the latter being held in sealing contact with said upper surface of the hub by a retaining bolt 43 and coil spring 44. A ball thrust bearing 45 is interposed between the coil spring 44 and said cover plate 42. In proximity to the periphery of this cover plate is a device for holding the latter against rotation, such consisting of a link 46 connected at one end to the cover plate by means of a vertical pin 47 and at its outer end being anchored in a bracket 48. Thus, the cover plate is held stationary while all of the remaining elements of the transfer wheel described above, may rotate continuously. The vacuum supply means comprises a conduit 49 which is connected to the cover plate 42 and opens into the vacuum chamber 17 and at its other end obviously, is connected to a suitable source of vacuum (not shown). Spaced approximately 90° from the vacuum chamber 17 (Fig. 5) is a vent opening, or exhaust port 50 in the cover 42, through which the suction cups successively communicate with the atmosphere so that the vacuum is broken and bottles to be transferred to the by-pass conveyor 12, will automatically be released by the transfer wheel.

Figure 6:
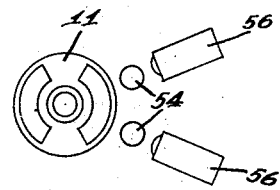
Figs. 6 and 7 are top plan and side elevational views respectively, showing more or less diagrammatically the precise preferred positioning of the sources of light and phototubes in relation to each other and a bottle, or such article.
Figure 7:
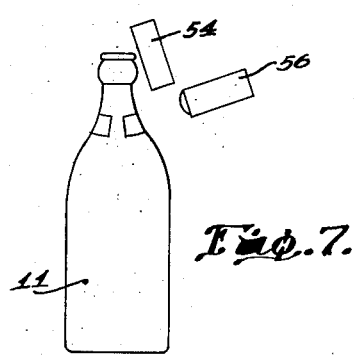

In the vacuum supply conduit 49 is a solenoid controlled vacuum valve 51 which normally is closed, but may be opened by operation of a relay (not shown) in the amplifier 52 (Fig. 2). This amplifier is connected to electric current supply lines 53 and to a pair of phototubes 54 by means of electric conductors 55. Associated with each phototube 54 is a lamp 56 which is connected to the source of electric current by means of conductors 57 and 58. These lamps burn continuously during operation of the apparatus and constantly direct beams of light against the preselected area or zone of the bottle. As shown in Figs. 6 and 7, the lamps 56 are positioned approximately 45° apart in a horizontal plane and inclined so that the beam of light from each lamp extends along a path substantially normal to the plane of the surface decoration or label which is intended to reflect a substantial part of the light. Each phototube 54 is positioned adjacent to the inner end of a lamp 56 so that is will pick up the "secondary glare" from the applied surface decoration. This was discovered to be an important factor in the successful operation of my article sorting apparatus since substantially the same reflection factor prevailed in plain and ACL decorated bottles, and as a consequence, the apparatus could detect the secondary light or glare, but not the direct reflection. In order to reset the relay for successive scanning operations, and thereby insure individual checking of the bottles, the relay is connected through electric conductors 59 to a micro-switch 60 (Figs. 1 and 2), the latter including an actuating arm 61 provided with a cam roll 62 at its free end. This micro-switch is mounted over the transfer wheel and the arm is positioned so that the roll carried thereby will, at regular intervals, drop into recesses 63 formed in an upstanding annular flange 64 rising from the inner margin of the upper starwheel 28. These recesses which together with the collar in effect provide a continuously moving cam, are in vertical alignment, or register, with the suction cups 16, in consequence of which, the micro-switch 60 is opened immediately following passage of one of the suction cups circumferentially therebyond, with the result that the circuit is broken and immediate closing of the solenoid controlled valve 51, is assured.

In operation, the bottles move continuously along the conveyor 10 on their way to a labeler or decorating machine (not shown) and thence to a packing station (not shown). Whenever an already decorated or labeled bottle reached the transfer point, the decorated surface is scanned by the lamps 56, or lights, and the reflected light causes actuation of the phototubes 54, or one of them, and this in turn operates through the amplifier and relay to open the solenoid vacuum control valve 51, with the result that air is quickly exhausted from the suction cup with which the already decorated bottle has been brought into firm contact under the influence of the yieldingly mounted roller 18. The wheel continues to revolve and carries with it the bottle which is securely attached by suction to the vacuum suction cup. The microswitch 60 opens immediately and as stated above, de-energizes the vacuum valve solenoid, permitting said valve to close. Vacuum in the particular cup is maintained however, owing to the fact that the bore 40 is sealed shut by means of the cover plate 42. When the transfer wheel has rotated sufficiently to bring the bottle to the receiving end of the by-pass conveyor 12, the bore 40 leading to this particular suction cup, moves into register with the vent opening 50. Atmospheric air enters the bore and immediately breaks the vacuum resulting in the release of the article to the by-pass conveyor 12.

As indicated heretofore, this apparatus may very well be utilized merely for the purpose of dividing a single line of containers into two or more lines, such very frequently being desirable in order to facilitate handling of the items.

Modifications may be resorted to within the spirit and scope of the appended claims.

I claim:

1. Apparatus of the character described comprising means for conveying articles seriatim along a horizontal path, a horizontal conveyor disposed at an angle to said path at a point intermediate the ends of the latter and to which such articles may be transferred directly from said path, a peripherally pocketed continuously rotating transfer wheel having its axis extending vertically and positioned at the juncture of the conveyor and said path to effect such transfer of the articles, an annular series of suction cups corresponding to the number of and mounted in the pockets carried by the wheel, said suction cups opening radially outward of said wheel for engagement with articles moving along said path, a vacuum supply conduit, a rotary vacuum distributor forming a part of the wheel and establishing communication between the conduit and said suction cups one at a time in a predetermined arc of the path of rotation of said suction cups, a normally closed solenoid valve in the vacuum supply conduit, and means actuated in response to the presence of a predetermined distinctive external surface formation on an article brought into contact with a suction cup for momentarily opening said solenoid valve whereby to exhaust air from the suction cup and effect removal of the contacting article from said horizontal path.

2. The structure defined in claim 1 in which the last-named means is an electronic unit.

3. The structure defined in claim 1 in which the last-named means is an electronic unit actuated in response to the presence of a predetermined distinctive external surface formation of an article brought into contact with a suction cup, for opening the solenoid valve.

4. Apparatus of the character described comprising means for conveying articles seriatim along a horizontal path, a horizontal conveyor disposed at an angle to said path at a point intermediate the ends of the latter and to which such articles may be transferred directly from said path, a peripherally pocketed continuously rotating transfer wheel having its axis extending vertically and positioned at the juncture of the conveyor and said path to effect such transfer of the articles, an annular series of suction cups corresponding to the number of and mounted in the pockets carried by the wheel, said suction cups opening radially outward of said wheel for engagement with articles moving along said path, a vacuum supply conduit, said transfer wheel including a rotary hub upon which the suction cups are mounted, an annular series of vacuum ports communicating with the suction cups and opening through the upper side of said hub, a stationary cover having sealing contact with the upper side of the hub and provided with a port connected to the vacuum supply conduit and positioned for register with the vacuum ports one at a time during rotation of the hub, said cover having a vent port spaced circumferentially from the other port for register with the vacuum ports one at a time, a normally closed solenoid valve in the vacuum supply conduit, and means actuated in response to the presence of a predetermined distinctive external surface formation on an article brought into contact with a suction cup for momentarily opening the solenoid valve whereby to attach such article to the suction cup and effect transfer of the former to said horizontal conveyor.

5. In apparatus of the character described, an article transfer wheel having its axis disposed vertically, said transfer wheel comprising upper and lower starwheels having vertically aligned pairs of peripheral recesses opening radially outward to accommodate articles, a hub portion intermediate said starwheels, said hub and starwheels being connected together for rotation as a unit about said axis, driving means connected to said hub, resilient vacuum cups individual to said peripheral recesses, each said cup being carried by the hub and extending radially outward therefrom sufficiently that an open outer end projects into the corresponding recess, vacuum ports in the hub individual to said cups and opening through the upper side of the hub at circumferentially spaced points, a stationary cover overlying the hub and closing said vacuum ports, said cover having a single vacuum port of limited circumferential extent common to all of the first-named vacuum ports and adapted to register with the latter one at a time incident to rotation of said hub portion relative to the cover, a vacuum conduit connected to said single vacuum port, a normally closed solenoid valve in the vacuum conduit, and means operable in response to the presence of a specific predetermined surface formation on the articles, while positioned in contact with one of the suction cups for opening said solenoid valve.

6. The structure defined in claim 5 in which the driving means is a friction clutch attached at least in part to the lower starwheel.

7. In apparatus of the character described, an article transfer wheel having its axis disposed vertically, said transfer wheel comprising upper and lower starwheels having vertically aligned pairs of peripheral recesses opening radially outward to accommodate articles, a hub portion intermediate said starwheels, said hub and starwheels being connected together for rotation as a unit about said axis, driving means connected to said hub, resilient vacuum cups individual to said peripheral recesses, each said cup being carried by the hub and extending radially outward therefrom sufficiently that an open outer end projects into the corresponding recess, vacuum ports in the hub individual to said cups and opening through he upper side of the hub at circumferentially spaced points, a stationary cover overlying the hub and closing said vacuum ports, said cover having a single vacuum port of limited circumferential extent common to all of the first-named vacuum ports and adapted to register with the latter one at a time incident to rotation of said hub portion relative to the cover, a vacuum conduit connected to said single vacuum port, means for bringing articles successively into said peripheral recesses as the wheel rotates, a normally closed solenoid valve in the vacuum conduit, and means actuated by articles having predetermined distinctive external surface characteristics for opening said valve momentarily while such article is in one of the recesses and in contact with the corresponding vacuum cup.

8. The structure defined in claim 7, wherein the last-named means is an electronic unit.

9. The structure defined in claim 7, wherein the last-named means is an electronic unit comprising a light source for directing a beam of light against a selected exterior surface area of the articles, a phototube actuated by light reflected from a coating on at least a part of said surface area and an amplifier in an electrical circuit including the phototube and solenoid valve.

10. The combination defined in claim 7, wherein the last-named means is an electronic unit comprising a light source continuously directing a beam of light along a predetermined fixed path, a phototube positioned to be actuated by light reflected from a surface coating on articles moving through said beam of light and an amplifier in an electrical circuit including the phototube and solenoid valve.

11. In apparatus of the character described, means for conveying articles seriatim along a horizontal path, a horizontal conveyor disposed at an angle to said path and to which such articles may be transferred directly at a point intermediate the ends of said path, means comprising a series of suction cups moving continuously in a closed horizontal path for successively transferring the articles, means for bringing articles into contact with the suction cups while moving along said path, means for exhausting the air from said cups during contact of the latter with the articles, means for venting the cups to the atmosphere after they have moved to a position adjacent said horizontal conveyor, and means actuated by a predetermined distinctive exterior surface formation of an article for effecting the exhaust of air from a suction cup and consequent transfer of an article to the horizontal conveyor.

12. Apparatus of the character described comprising a peripherally pocketed wheel mounted for rotation about a vertical axis, means for rotating it continuously, radial outwardly opening suction cups individual to the pockets, means for bringing articles successively into engagement with the cups, means operable in response to the presence of a predetermined distinctive exterior surface formation on articles for effecting the exhaust of air from suction cups engaged with such articles thereby to cause travel of such articles with the wheel, and means operable at a predetermined point in the path of travel of the cups to open them to the atmosphere and thereby effect the release of articles by the cups.

References Cited in the file of this patent
UNITED STATES PATENTS

| 2,054,319 | Hanson | Sept. 15, 1936 |
| 2,643,778 | Socke | June 30, 1953 |